(12) United States Patent
Masumiya et al.

(10) Patent No.: US 10,569,348 B2
(45) Date of Patent: Feb. 25, 2020

(54) GROOVE-FORMING METHOD, CONTROL DEVICE FOR MACHINE TOOL AND TOOL PATH GENERATING DEVICE

(75) Inventors: Yasunori Masumiya, Aiko-gun (JP); Keitaro Suzuki, Aiko-gun (JP); Kyohei Suzuki, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 110 days.

(21) Appl. No.: 14/411,354

(22) PCT Filed: Jun. 29, 2012

(86) PCT No.: PCT/JP2012/066776
§ 371 (c)(1),
(2), (4) Date: Dec. 24, 2014

(87) PCT Pub. No.: WO2014/002270
PCT Pub. Date: Jan. 3, 2014

(65) Prior Publication Data
US 2015/0151445 A1    Jun. 4, 2015

(51) Int. Cl.
*B23C 3/32* (2006.01)
*A47J 47/00* (2006.01)
(Continued)

(52) U.S. Cl.
CPC .............. *B23C 3/32* (2013.01); *A47J 47/005* (2013.01); *B23C 3/28* (2013.01); *B26D 3/06* (2013.01); *Y10T 83/0304* (2015.04)

(58) Field of Classification Search
CPC ............ Y10T 83/0304; Y10T 83/0316; Y10T 83/0319; Y10T 83/0326; Y10T 83/8878;
(Continued)

(56) References Cited

U.S. PATENT DOCUMENTS 5,285,598 A * 2/1994 Arita ...................... B28D 1/041
                                                            408/1 R
5,641,252 A * 6/1997 Eriksson ................. B23B 35/00
                                                            408/1 R
(Continued)

FOREIGN PATENT DOCUMENTS

FR     1 410 583        9/1965
GB     1071220          6/1967
(Continued)

OTHER PUBLICATIONS

Extended European Search Report dated Jan. 28, 2016, directed to EP Application No. 12880260.0; 8 pages.
(Continued)

*Primary Examiner* — Phong H Nguyen
(74) *Attorney, Agent, or Firm* — Morrison & Foerster LLP

(57) ABSTRACT

A fluting method for forming a flute in a workpiece while the workpiece is moved relative to a rotating tool by the combination of a rotating feed shaft with other feed shafts, the method comprising a machining process of relatively moving the rotating tool on a tool path that runs along the direction in which the flute extends and machining the workpiece using a rotating tool with a diameter that is smaller than the width of the flute. The machining process changes the relative position of the rotating tool with respect to the workpiece and performs machining multiple times so that the rotating tool makes internal contact with a circle that has the width of the flute being formed in the workpiece as the diameter.

4 Claims, 15 Drawing Sheets

(51) Int. Cl.
*B23C 3/28* (2006.01)
*B26D 3/06* (2006.01)

(58) Field of Classification Search
CPC ....... Y10T 83/0524; Y10T 83/04; B26D 3/06;
B26D 3/24; B23C 3/28; B23C 3/32; A47J
47/005; A47G 19/022; B26B 29/063;
G06Q 90/00; G09B 19/18
See application file for complete search history.

(56) References Cited

U.S. PATENT DOCUMENTS

| | | | | |
|---|---|---|---|---|
| 5,685,674 | A * | 11/1997 | Tåquist | B23B 51/02 408/1 R |
| 6,869,259 | B2 * | 3/2005 | Lebkuechner | B23C 3/18 29/557 |
| 6,890,134 | B1 * | 5/2005 | Wagner | B23C 3/32 409/131 |
| 7,905,692 | B2 * | 3/2011 | Hamura | B23Q 1/34 310/12.01 |
| 8,256,092 | B1 * | 9/2012 | Woodruff | B23B 41/12 29/557 |
| 2006/0140734 | A1 * | 6/2006 | Glaesser | B23C 3/18 409/132 |

FOREIGN PATENT DOCUMENTS

| | | |
|---|---|---|
| JP | 6-320320 | 11/1994 |
| JP | 11-226811 | 8/1999 |
| JP | 11-347823 | 12/1999 |
| JP | 2012-86296 | 5/2012 |
| WO | WO-2006/011353 | 2/2006 |

OTHER PUBLICATIONS

International Search Report dated Oct. 2, 2012, directed to International Application No. PCT/JP2012/066776; 1 page.

\* cited by examiner

GROOVE-FORMING METHOD, CONTROL DEVICE FOR MACHINE TOOL AND TOOL PATH GENERATING DEVICE

CROSS REFERENCE TO RELATED APPLICATIONS

This application is a U.S. National Phase patent application of PCT/JP2012/066776, filed on Jun. 29, 2012, which is hereby incorporated by reference in the present disclosure in its entirety.

FIELD OF THE INVENTION

The present invention relates to a groove-forming method, a control device of a machine tool and a tool path generating device.

BACKGROUND OF THE INVENTION

Known in the prior art have been machine tools which make a rotary tool rotate to cut or otherwise machine a workpiece. Further, in such machine tools, there has been known a numerical control type of machine tool which designates a path of a rotary tool by coordinates of predetermined axes etc. and machines the workpiece while making the rotary tool automatically move.

In a machine tool, it is possible to perform a groove-forming operation which forms a groove part in the surface of a workpiece. In a groove-forming operation, it is possible to use an end mill or other rotary tool to cut a workpiece while changing the relative positions of the workpiece and the rotary tool so as to form a groove part which extends in a desired direction.

Japanese Patent Publication No. 11-347823A (PLT 1) discloses a cutting method which forms a deep groove by reciprocating motion of an end mill wherein the direction and magnitude of the cutting resistance are made constant in the tool feed direction. In this formation of a groove, it is possible to make the cutting resistance equal in the outbound path and the return path by setting the depths of cut different from each other. It is disclosed that by this machining method, it is possible to prevent bending or tilting of the groove or other deterioration in the shape precision.

PLT 1: Japanese Patent Publication No. 11-347823A

SUMMARY OF THE INVENTION

When producing a cylindrical cam etc. comprised of a columnar shaped member in the peripheral direction surface of which a groove part is formed, it is possible to make the rotary tool rotate in position relative to the workpiece so as to form the groove part. That is, it is possible to perform relative motion for rotation about a predetermined axis of rotation to thereby form a groove part in the circumferential direction surface.

In this regard, when forming a large width groove part in the surface of a workpiece, it is possible to use a large-sized rotary tool which has the same diameter as the groove width. By making the large-sized rotary tool move along the direction of extension of the groove part, it is possible to form a groove part of a desired width. However, in this case, there is the problem that when the rotary tool becomes worn, fine adjustment of the groove width is not possible. Further, there is the problem that to change the groove width, it is necessary to prepare a rotary tool which has the same diameter as the desired groove width.

On the other hand, when forming a large width groove part, it is possible to use a dedicated tool head (eccentric holder) for making the rotary tool engage in planetary rotation motion. However, a dedicated tool head which performs planetary rotation motion is smaller in rigidity, so cannot increase the depth of cut. For this reason, it is necessary to set the feed rate of the tool head small. Further, the rotary tool revolves while rotating, so the time when the surface being cut is not contacted becomes longer. For these reasons, when using a tool head which engages in planetary rotation motion, there is the problem that the machining time becomes longer. Further, when forming a groove part of cylindrical cam or other groove part, there was the problem that the machining precision was low and precise machining by the desired groove width was not possible The groove-forming method of the present invention is a groove-forming method which combines a rotational feed axis and other feed axes to make a rotary tool and a workpiece relatively move while forming a groove part in the workpiece, comprising a machining step of using a rotary tool which has a diameter smaller than the width of the groove part and making the rotary tool relatively move by a tool path along a direction of extension of the groove part to machine the workpiece. The machining step performs machining a plurality of times while changing a relative position of the rotary tool with respect to the workpiece so that the rotary tool is inscribed inside a circle which has the same diameter as the width of the groove part which is formed at the workpiece.

In the above invention, the machining step sets an inclination of the rotary tool so that a center axis of the circle which has the same diameter as the width of the groove part and a center axis of the rotary tool become parallel.

In the above invention, the machining step can include an outbound and return movement step which makes the rotary tool reciprocate along a direction of extension of the groove part, one of the side surfaces of the groove part can be machined at an outbound path of the outbound and return movement step and the other side surface of the groove part can be machined while maintaining a rotation direction of rotation of the rotary tool the same as the rotation direction of the outbound path at a return path of the outbound and return movement step.

In the above invention, the range of inscription inside the circle which has the same diameter as the width of the groove part can include a range of machining the side surface of the groove part and a range of not machining the side surface of the groove part, and the machining step can perform machining a plurality of times while changing the relative position of the rotary tool in the range of machining the side surface of the groove part.

In the above invention, when making a direction vertical to the direction of extension of the groove part a reference direction, the method can perform machining a plurality of times while changing the relative position of the rotary tool with respect to the workpiece at the inside of a range of a predetermined angle with respect to the reference direction.

The control device of a machine tool of the present invention is a control device of a machine tool which combines a rotational feed axis and other feed axes to make a rotary tool which has a diameter smaller than a width of the groove part and a workpiece relatively move while forming a groove part in the workpiece, comprising an input information reading part which reads input information for forming the groove part by a virtual rotary tool which has the same diameter as the width of the groove part and a path setting part which uses the input information as the basis to set a tool path for making the rotary tool relatively move in a direction of extension of the groove part. The path setting part sets a tool path for performing machining a plurality of times while changing a relative position of the rotary tool with respect to the workpiece so that the rotary tool is inscribed inside a circle which has the same diameter as the width of the groove part which is formed at the workpiece.

In the above invention, the path setting part can include a virtual advance direction setting part which uses the input information as the basis to set a virtual direction of advance when using the virtual rotary tool to form the groove part, a range setting part which uses the virtual direction of advance to set a range of placement of the rotary tool, and a position setting part which sets a plurality of positions for placement of the rotary tool at the inside of the range of placement of the rotary tool.

In the above invention, the range of inscription inside the circle which has the same diameter as the width of the groove part can include a range of machining the side surface of the groove part and a range of not machining the side surface of the groove part, and the position setting part can set the position of the rotary tool in the range of machining the side surface of the groove part.

In the above invention, the range setting part can set a direction vertical to the virtual direction of advance as a reference direction and can set a range of a predetermined angle with respect to the reference direction to set a range of placement of the rotary tool.

The tool path generating device of the present invention is a tool path generating device which combines a rotational feed axis and other feed axes to generate a tool path for making a rotary tool which has a diameter smaller than the width of the groove part and a workpiece relatively move while forming a groove part in the workpiece, comprising a shape data reading part which reads shape data of the workpiece and a path setting part which uses the shape data as the basis to set a tool path for making the rotary tool relatively move in a direction of extension of the groove part. The path setting part sets a tool path for performing machining a plurality of times while changing a relative position of the rotary tool with respect to the workpiece so that the rotary tool is inscribed inside a circle which has the same diameter as the width of the groove part which is formed at the workpiece.

According to the present invention, it is possible to provide a groove-forming method, a control device of a machine tool, and a tool path generating device which enables precise machining in a short time when forming a groove part in a workpiece.

DETAILED DESCRIPTION OF THE INVENTION

Referring to FIG. 1 to FIG. 21, a groove-forming method and a control device of a machine tool and tool path generating device in an embodiment will be explained. As the machine tool of the present embodiment, a horizontal type machining center with a spindle which extends in the horizontal direction will be explained as an example.

Figure 1:
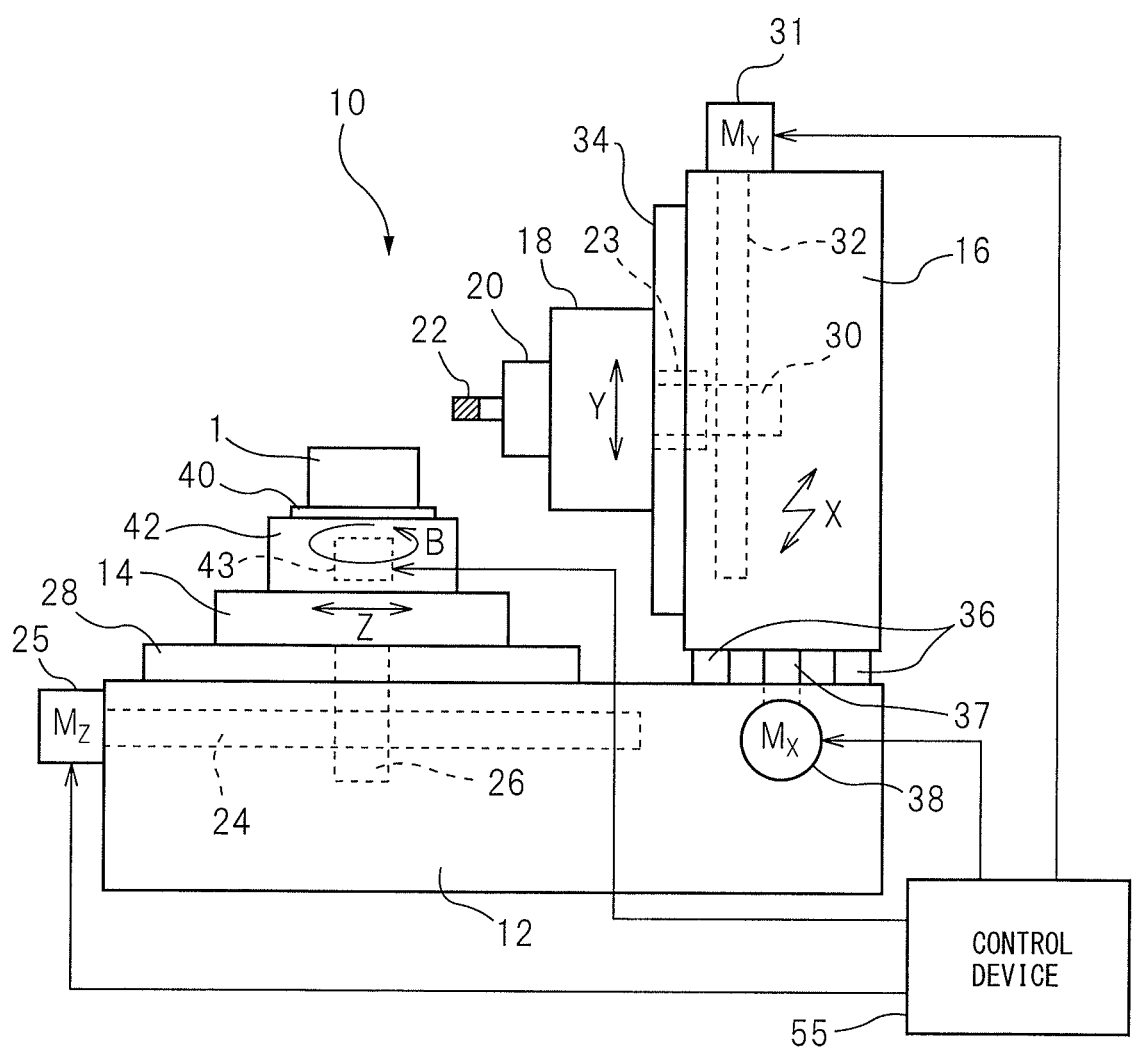
FIG. 1 is a schematic view of a numerical control type of machine tool in an embodiment.

FIG. 1 is a schematic view of a numerical control type of machine tool in the present embodiment. A machine tool 10 is provided with a bed 12 which is set on the floor of a factory etc. On the top surface of the bed 12, a Z-axis guide rail 28 is fastened. The Z-axis in the present embodiment extends in the horizontal direction. The Z-axis guide rail 28 is arranged so as to extend in the Z-axis direction (left-right direction in FIG. 1).

The machine tool 10 in the present embodiment is provided with a movement device which makes the rotary tool 22 and the workpiece 1 move relatively. At the top surface of the Z-axis guide rail 28, a table 14 is arranged. The table 14 is arranged to be able to slide with respect to the Z-axis guide rail 28. The table 14 therefore moves along the Z-axis. On the top surface of the table 14, a numerical control type of rotary table 42 is arranged for making the workpiece 1 rotate in the B-axis direction. On the top surface of the rotary table 42, a workpiece 1 is fastened through a workpiece-use holding member 40.

At the top surface of the bed 12, an X-axis guide rail 36 is fastened. The X-axis in the present embodiment perpendicularly intersects the Z-axis and further extends in the horizontal direction (direction vertical to paper surface of FIG. 1). The X-axis guide rail 36 is formed so as to extend along the X-axis. At the X-axis guide rail 36, a column 16 is arranged to be able to slide. The column 16 moves along the X-axis.

At the column 16, a Y-axis guide rail 34 is fastened to the front surface facing the workpiece 1. The Y-axis in the present embodiment extends along a direction perpendicular to the X-axis and Z-axis. The Y-axis guide rail 34 extends along the Y-axis. On the Y-axis guide rail 34, a spindle head 18 is arranged. The spindle head 18 is formed to be able to slide on the Y-axis guide rail 34. The spindle head 18 moves along the Y-axis. The spindle head 18 is formed so as to rotatably support a spindle 20.

The movement device of the present embodiment includes a Z-axis movement device which makes the rotary tool 22 move relative to the workpiece 1 in the Z-axis direction. In the present embodiment, at the inside of the bed 12, at the downside of the table 14, a Z-axis feed screw 24 is arranged. The Z-axis feed screw 24 extends in the Z-axis direction. At the bottom surface of the table 14, a nut 26 is fastened. The nut 26 screws over the Z-axis feed screw 24. At one end part of the Z-axis feed screw 24, a Z-axis servo motor 25 is connected. By driving the Z-axis servo motor 25 to make the Z-axis feed screw 24 rotate, the nut 26 moves in the Z-axis direction. The table 14 moves together with movement of the nut 26 along the Z-axis guide rail 28. As a result, the workpiece 1 moves in the Z-axis direction.

The machine tool 10 of the present embodiment is provided with an X-axis movement device which makes the rotary tool 22 move relative to the workpiece 1 in the X-axis direction. The X-axis movement device, in the same way as the Z-axis movement device, includes an X-axis feed screw which is arranged at the inside of the bed 12 at the downside of the column 16. The X-axis feed screw is formed so as to extend in the X-axis direction. At the bottom surface of the column 16, a nut 37 which is screwed over the X-axis feed screw is fastened. At one end of the X-axis feed screw, an X-axis servo motor 38 is coupled. By driving the X-axis servo motor 38 and making the X-axis feed screw rotate, the nut 37 moves in the X-axis direction. The column 16 moves together with movement of the nut 37 along the X-axis guide rail 36. As a result, the rotary tool 22 moves in the X-axis direction.

The machine tool 10 of the present embodiment is provided with a Y-axis movement device which makes the rotary tool 22 move relative to the workpiece 1 in the Y-axis direction. At the inside of the column 16, a Y-axis feed screw 32 is arranged. The Y-axis feed screw 32 is formed so as to extend in the Y-axis direction. At the back surface of the spindle head 18, a nut 30 which is screwed over the Y-axis feed screw 32 is fastened. At the top end of the Y-axis feed screw 32, a Y-axis servo motor 31 is connected. By driving the Y-axis servo motor 31 and making the Y-axis feed screw 32 rotate, the nut 30 moves in the Y-axis direction. The spindle head 18 moves together with the movement of the nut 30 along the Y-axis guide rail 34. As a result, the rotary tool 22 moves in the Y-axis direction.

The machine tool 10 of the present embodiment is provided with a B-axis movement device which makes the rotary tool 22 move relative to the workpiece 1 in the B-axis direction. The rotary table 42 includes a B-axis servo motor 43 for making the workpiece 1 rotate. By the drive operation of the B-axis servo motor 43, the workpiece 1 rotates in the B-axis direction.

The rotary tool 22 is arranged at the front end of the spindle 20. In the present embodiment, as the rotary tool 22, an end mill is attached. At the spindle 20, a motor 23 is connected for making the rotary tool 22 rotate. By the drive operation of the motor 23, the rotary tool 22 rotates about the center axis of the spindle as the axis of rotation.

The machine tool 10 in the present embodiment has linear feed axes (X-axis, Y-axis, and Z-axis) and a rotational feed axis (B-axis). It is possible to make the rotary tool 22 rotate while making the column 16, spindle head 18, and table 14 operate in the X-axis, Y-axis, and Z-axis directions so as to cut the workpiece 1 which is fastened to the table 14 to a desired shape. Furthermore, it is possible to drive the rotary table 42 so as to make the workpiece 1 rotate about the B-axis. The machine tool 10 in the present embodiment functions as a four-axis machine tool which has a B-axis.

In the present embodiment, the machine tool 10 which is shown in FIG. 1 is used to perform the groove-forming method to form a groove part in the surface of the workpiece 1.

Figure 2:
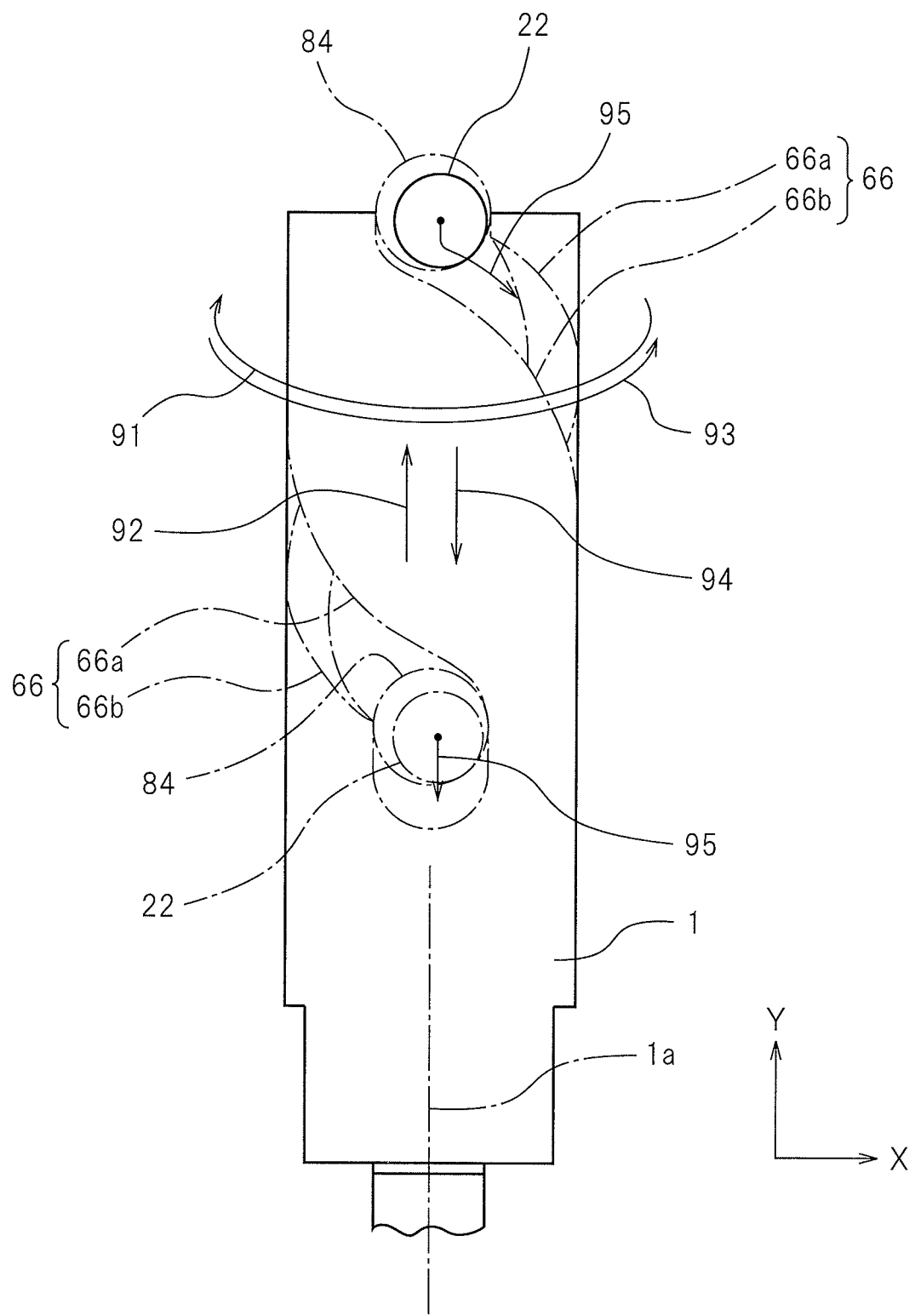
FIG. 2 is a schematic view of a workpiece on which a groove is formed and a groove part in an embodiment.

FIG. 2 is a schematic plan view of a workpiece 1 in the present embodiment. In the present embodiment, a groove part 66 is formed at the peripheral direction surface of a columnar shaped workpiece 1. The groove part 66 extends in a spiral shape at the surface of the workpiece 1. By a groove-forming operation which forms such a groove part 66, for example, it is possible to produce a cylindrical cam etc.

Referring to FIG. 1 and FIG. 2, when forming a groove part 66 in the workpiece 1, the workpiece 1 is fastened to the rotary table 42 so that the center axis 1a of the workpiece 1 becomes parallel to the Y-axis. Further, the workpiece 1 is fastened so that the center axis 1a matches the axis of rotation of the rotary table 42. In the machining of the workpiece 1, the workpiece 1 is made to rotate in the B-axis direction in addition to movement in the X-axis direction and the Y-axis direction.

In the groove-forming method of the present embodiment, the rotary tool 22 is used as a first rotary tool which has a diameter smaller than the width of the groove part 66 for cutting. As the rotary tool 22, for example, an end mill can be used. The groove part 66 in the present embodiment has a substantially square cross-sectional shape and has one side surface 66a and the other side surface 66b.

The groove part 66 in the present embodiment is formed so that the depth becomes constant. Further, the groove part 66 is formed so that the width also becomes constant. When forming such a groove part 66, control is performed to change the X-axis position, Y-axis position, and B-axis position of the rotary tool 22 along the surface of the workpiece 1 without changing the relative position in the depth direction (Z-axis position) at the time of cutting.

The groove-forming method of the present embodiment includes an outbound and return movement step which makes the rotary tool 22 move reciprocating along the shape of the groove part 66. At the outbound path of the outbound and return movement step, one side surface 66a of the groove part 66 is processed. As shown by the arrow 95, the rotary tool 22 is made to move relatively in the direction of extension of the groove part 66 so as to machine one side surface 66a of the groove part 66. In the machine tool 10 of the present embodiment, as shown by the arrow 92, the workpiece 1 is made to move in the Y-axis direction while, as shown by the arrow 91, the workpiece 1 is made to rotate about the center axis 1a to thereby make the workpiece 1 and the rotary tool 22 move relative to each other. When the rotary tool 22 reaches the predetermined end part of the groove part 66, the rotary tool 22 is moved in the X-axis direction and the Y-axis direction to arrange it at the position of the return path. After this, the direction of relative movement is changed to perform machining along the return path.

At the return path of the outbound and return movement step, the other side surface 66b of the groove part 66 is machined. The rotary tool 22 is made to move relatively in the direction of extension of the groove part 66 to form the groove part 66. In the present embodiment, as shown by the arrow 94, the workpiece 1 is made to move in the X-axis direction and the Y-axis direction while the workpiece 1 is made to rotate as shown by the arrow 93, whereby relative movement of the workpiece 1 and the rotary tool 22 is performed.

In this regard, if using a rotary tool 22 which has a diameter smaller than the width of the groove part 66 to machine the side surfaces 66a, 66b of the groove part 66 one time, it is not possible to form a groove part 66 of the desired shape. Uncut parts will remain at parts of the side surfaces 66a, 66b of the groove part 66 in the depth direction. Here, the remaining uncut parts in the case of using a rotary tool 22 which has a diameter smaller than the width of the groove part 66 to machine the side surfaces of the groove part 66 will be explained.

Figure 3:
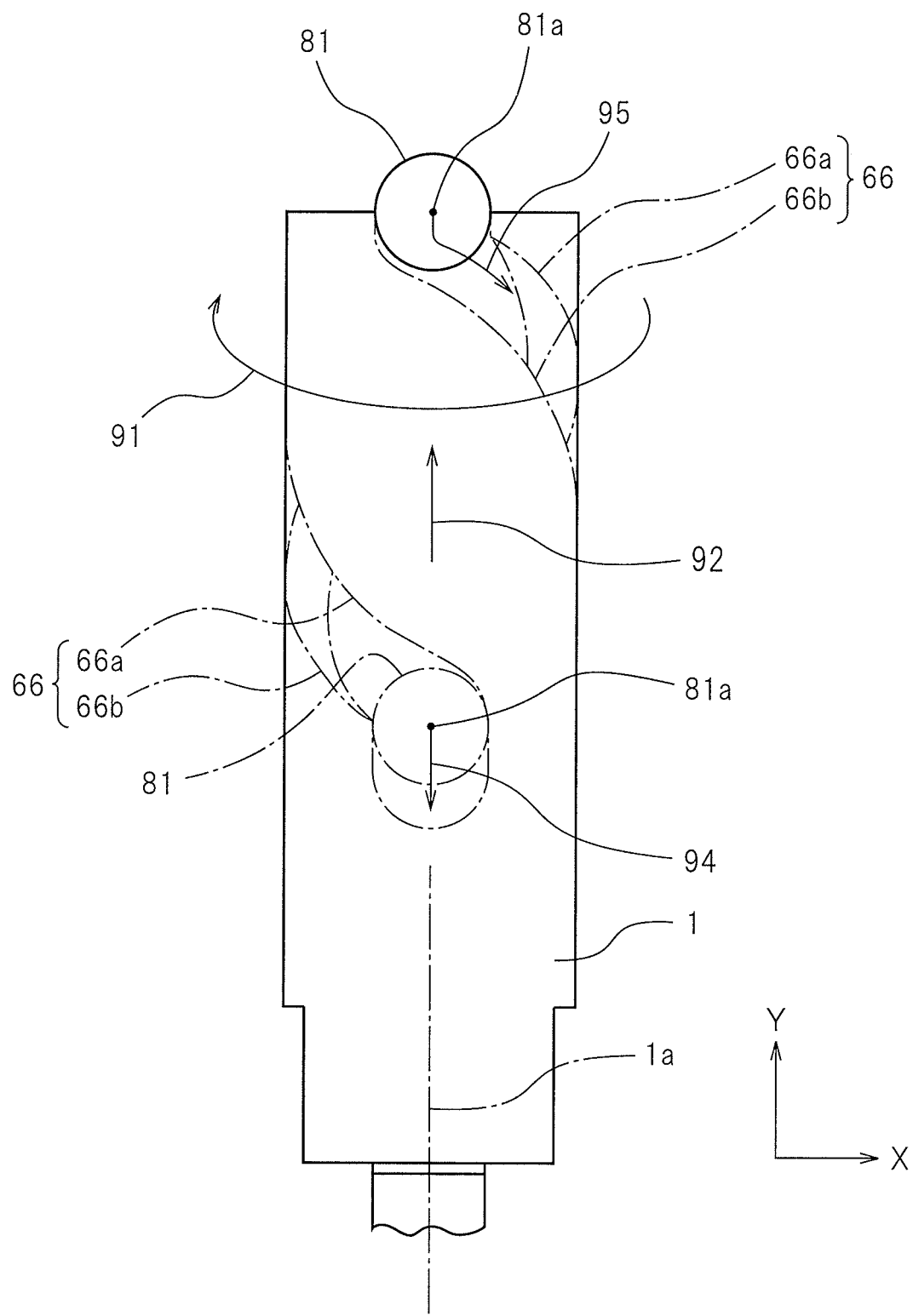
FIG. 3 is a schematic view of a workpiece and a groove part when using a rotary tool of a comparative example to form a groove.

FIG. 3 is a schematic plan view of a workpiece 1 when using a rotary tool of a comparative example. A rotary tool 81 of the comparative example used as a second rotary tool has a diameter the same as the width of the groove part 66. When using the rotary tool 81, as shown by the arrow 95, it is possible to make the rotary tool 81 move relatively one time along the direction of extension of the groove part 66 so as to form the groove part 66. In the machine tool 10 of the present embodiment, it is possible to make the workpiece 1 move in the Y-axis direction as shown by the arrow 92 while making the workpiece 1 rotate about the center axis 1a as shown by the arrow 91 to thereby form the groove part 66. When using the rotary tool 81 of the comparative example, it is possible to form one side surface 66a and the other side surface 66b by a single machining operation.

Figure 4:
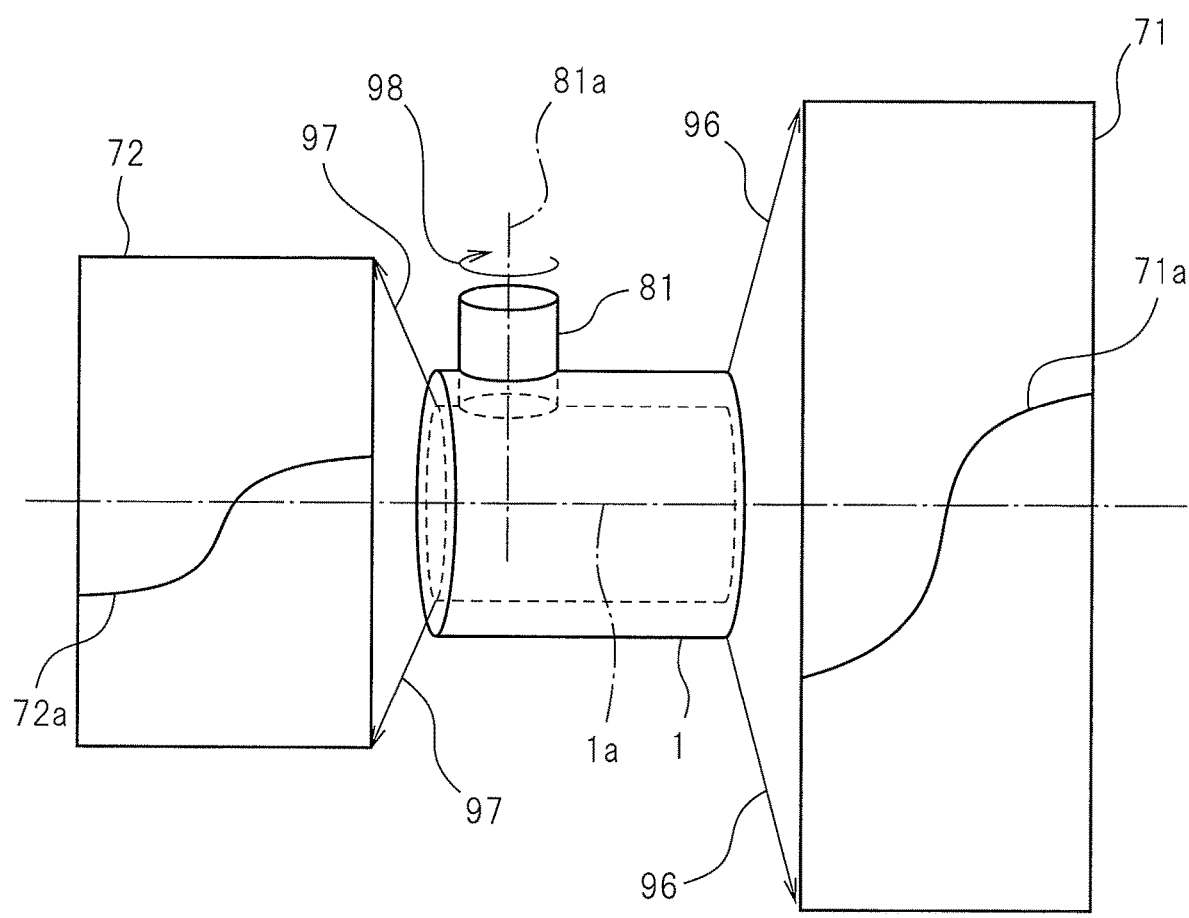
FIG. 4 is a view which explains the track of the center axis of the rotary tool when using a rotary tool of a comparative example to form a groove.

FIG. 4 is a schematic view which explains the locus of the center axis 81a of the rotary tool 81 when using the rotary tool 81 of the comparative example. In the example which is shown in FIG. 4, the rotary tool 81 is arranged so that the center axis 81a of the rotary tool 81 becomes parallel to the radial direction of the workpiece 1. That is, the center axis 1a of the workpiece 1 is arranged on an extension of the center axis 81a.

The rotary tool 81, as shown by the arrow 98, rotates about the center axis 81a. The rotary tool 81 is inserted at one end part at the inside of the workpiece 1. The development view 71 is a view which lays open the peripheral direction surface of the workpiece 1 as shown by the arrow 96. At the peripheral direction surface of the workpiece 1, a locus 71a through which the center axis 81a passed is shown. Further, the rotary tool 81 has a point on the center axis 81a at its front end, that is, the tool front end point. The development view 72 is a view which lays open the circumferential direction surface of the workpiece 1 through which the tool front end point passes as shown by the arrow 97. At the development view 72, the locus 72a of the tool front end point is shown.

If comparing the locus 71a of the point at the surface of the workpiece 1 on the tool center axis 81a and the locus 72a of the tool front end point, it will be understood that the locuses differ in shape from each other. The radii of rotation when the workpiece 1 rotates with respect to the rotary tool 81 differ from each other, so the locuses of these points differ. For this reason, the relative advancing directions of the rotary tool 81 with respect to the workpiece 1 differ in the depth direction of the groove part 66.

Figure 5:
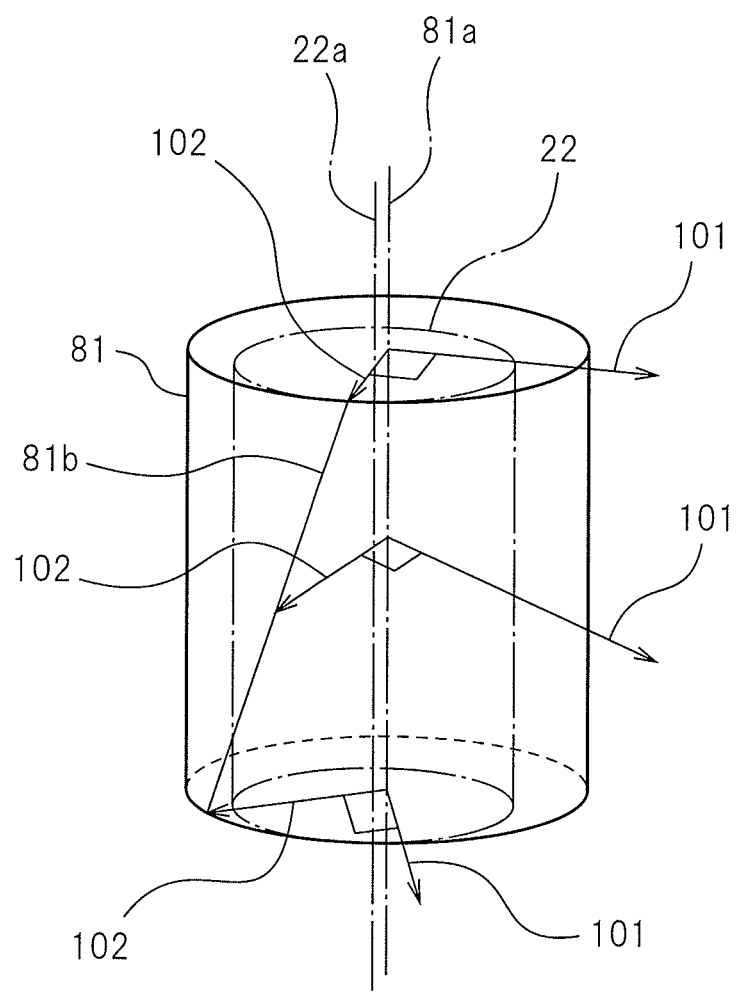
FIG. 5 is a schematic view which explains a virtual direction of advance and a part which forms the side surfaces of the groove part when using a rotary tool of a comparative example to form a groove.

FIG. 5 is a schematic view which explains a direction of movement of the center axis 81a when making a rotary tool 81 of a comparative example move with respect to a workpiece 1. The arrow 101 shows the virtual direction of advance at a predetermined point of the rotary tool 81 in the depth direction. The "virtual direction of advance" is the imaginary direction of advance when assuming the workpiece 1 is made to stop and the rotary tool moves. It is learned that the virtual direction of advance changes in the direction of extension of the center axis 81a. That is, it is learned that the virtual direction of advance changes in the depth direction of the groove part 66.

The arrow 102 shows the direction vertical to the directions of the arrows 101. The points of intersection of the arrow 102 and the surface of the rotary tool 81 become contact locations 81b. The contact locations 81b are parts which contact the workpiece 1 and form the side surfaces 66a, 66b of the groove part 66. In this case, there is the characteristic that the line of the contact locations 81b does not become parallel with the center axis 81a of the rotary tool 81. Note that, in the example which is shown in FIG. 5, the contact locations 81b are linear in shape, but sometimes the contact locations 81b are curved in shape.

When using a rotary tool 22 which has a diameter smaller than the width of the groove part 66, the rotary toll 22 can be arranged at an inclination whereby the center axis 22a becomes parallel with the center axis 81a of the virtual rotary tool 81. That is, it is possible to arrange the rotary toll 22 so that center axis 22a becomes substantially parallel to the center axis of the circle 84 which has a diameter the same as the width of the groove part. Further, it is possible to arrange it so that the surface of the rotary tool 22 contacts positions on the surface of the rotary tool 81 in the case of using the rotary tool 81. At this time, the center axis 22a of the rotary tool 22 becomes positioned offset from the center axis 81a of the rotary tool 81. That is, the center axis 22a is positioned offset from the diameter of the workpiece 1. Here, no matter how the position of the center axis 22a is selected, it is not possible for the surface of the rotary tool 22 to pass over all of the contact locations 81b by a single machining operation. For this reason, if arranging the rotary tool 22 for cutting, uncut parts remain at parts of the region in the depth direction of the groove part 66. There is the characteristic that even if using the rotary tool 22 to try to form the side surface 66a or the side surface 66b of the groove part 66 by one machining operation, it is not possible to obtain the desired shape of the side surface.

Therefore, in the groove-forming method in the present embodiment, to form one side surface of the groove part 66, the machining is performed a plurality of times while changing the relative position of the rotary tool 22 with respect to the workpiece 1.

Figure 6:
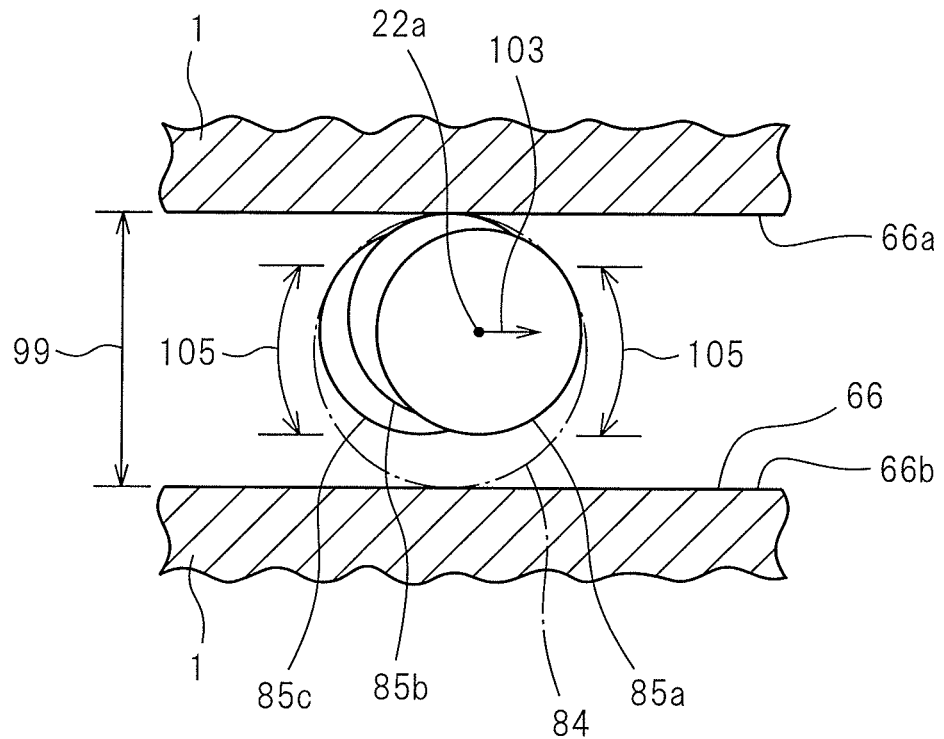
FIG. 6 is a schematic cross-sectional view when using a rotary tool of an embodiment to form a groove.

FIG. 6 is a schematic cross-sectional view which explains the groove-forming method in the present embodiment. The groove-forming method in the present embodiment uses a rotary tool 22 which has a diameter smaller than the width of the groove part 66 which is shown by the arrow 99. FIG. 6 illustrates machining of one side surface 66a of the groove part 66.

In the groove-forming method of the present embodiment, the inclination of the rotary tool 22 is set so that the center axis 22a of the rotary tool 22 becomes parallel to the depth direction of the groove part 66. That is, the inclination of the rotary tool 22 is set so that the center axis of the circle 84 for placement of the rotary tool 22 becomes parallel to the diameter of the workpiece 1.

In the groove-forming method of the present embodiment, one side surface 66a of the groove part 66 is machined a plurality of times while changing the positions of the rotary tool 21 a bit at a time. That is, the path of the rotary tool 22 is changed a bit at a time to form one side surface 66a. In the example which is shown in FIG. 6, in the first machining operation of the side surfaces 66a, the rotary tool 22 is placed at the position 85a. Further, as shown in the arrow 103, the rotary tool 22 is made to move relatively along the direction of extension of the groove part 66. In the second machining operation of the side surface 66a, the rotary tool 22 is arranged at the position 85b to make the rotary tool 22 move relatively along the direction of extension of the groove part 66. Further, at the third machining operation of the side surface 66a, the rotary tool 22 is arranged at the position 85c to make the rotary tool 22 move relatively along the direction of extension of the groove part 66. These positions 85a, 85b, and 85c are set so as to contact inside the circle 84 having a diameter the same as the width of the groove part 66.

In the machining of the return path as well, in the same way as the machining of the outbound path, to form the other side surface 66b of the groove part 66, the machining is performed a plurality of times while changing the position of the rotary tool 22. In the present embodiment, at the outbound path and the return path, the machining is performed three times while changing the position of the rotary tool 22. As the number of times of machining for forming one side surface, any number can be selected. By increasing the number of machining operations, it is possible to improve the precision of the shape of the groove part.

Figure 7:
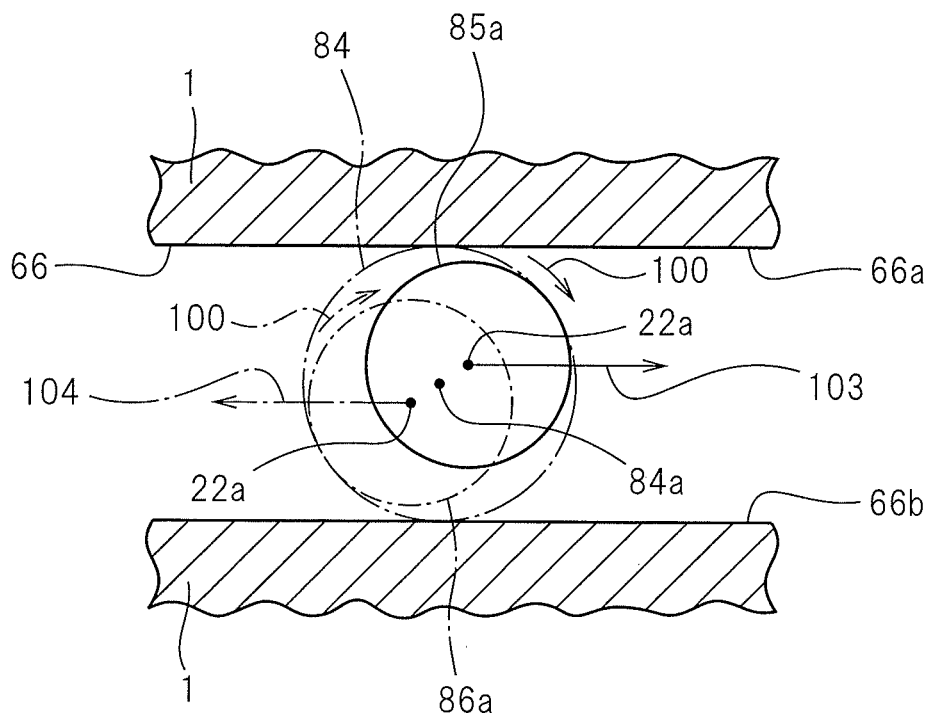
FIG. 7 is a schematic view which explains machining of a first outbound path and machining of a first return path in the groove-forming method of an embodiment.

FIG. 7 is a schematic cross-sectional view which explains the position of the outbound path and the position of the return path of a rotary tool 22 in first machining. The arrow 100 shows the direction of rotation of the rotary tool 22. The same rotation direction is employed in the outbound path and the return path. In the machining of the first outbound path, the rotary tool 22 is arranged at the position 85a. By making the rotary tool 22 move as shown by the arrow 103 along the shape of extension of the groove part 66, one side surface 66a is machined. In the processing of the first return path, the rotary tool 22 is arranged at the position 86a. By making the rotary tool 22, as shown by the arrow 104, move along the shape of extension of the groove part 66, the other side surface 66b is machined.

Figure 8:
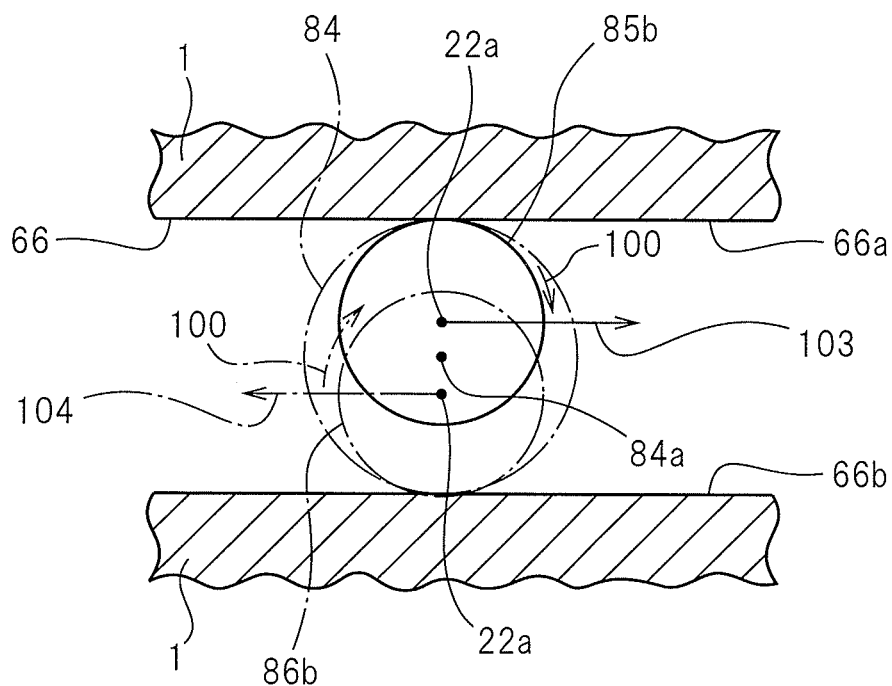
FIG. 8 is a schematic view which explains machining of a second outbound path and machining of a second return path in the groove-forming method of an embodiment.

FIG. 8 is a schematic cross-sectional view which explains the position of the outbound path and the position of the return path of a rotary tool 22 in second machining. In second machining, the rotary tool 22 is arranged at the position 85b in the outbound path and made to move in the direction which is shown by the arrow 103 so as to machine one side surface 66a. By arranging the rotary tool 22 at the position 86b at the return path and making it move in the direction which is shown by the arrow 104, the other side surface 66b is machined.

Figure 9:
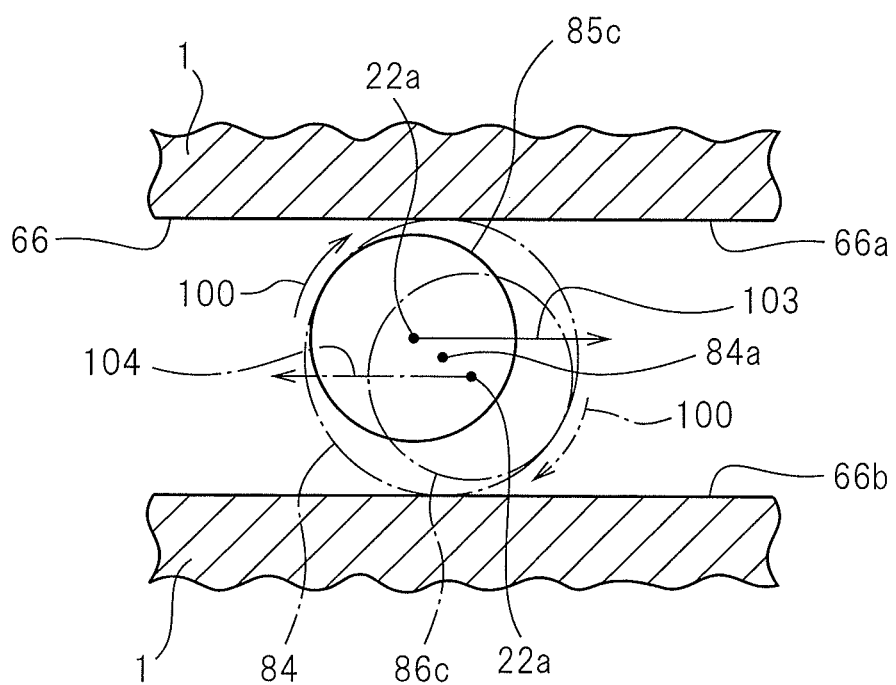
FIG. 9 is a schematic view which explains machining of a third outbound path and machining of a third return path in the groove-forming method of an embodiment.

FIG. 9 is a schematic cross-sectional view which explains the position of the outbound path and the position of the return path of the rotary tool 22 at the third processing. In the third processing as well, in the same way as first machining and the second machining, the rotary tool 22 is arranged at the position 85c at the outbound path and the one side surface 66a is machined. The rotary tool 22 is arranged at the position 86c at the return path to machine the other side surface 66b.

In the groove-forming method in the present embodiment, the positions 85a, 85b, 85c of the rotary tool 22 at the outbound path and the positions 86a, 86b, 86c of the rotary tool 22 at the return path become mutually symmetric positions. For example, in the first machining operation, the position 85a of the outbound path and the position 86a of the return path become symmetric positions with respect to the center point 84a of the circle 84. That is, the tool front end point of the position 85a and the tool front end point of the position 86a are set at positions symmetric with each other across the center point 84a of the circle 84.

Figure 10:
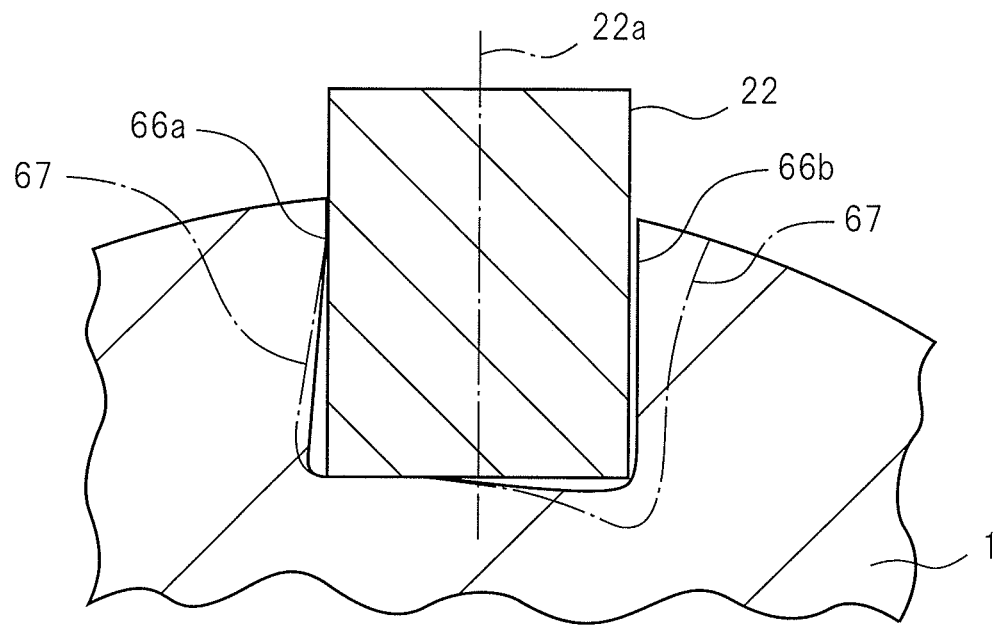
FIG. 10 is a schematic cross-sectional view which explains machining of a first outbound path in the groove-forming method of an embodiment.
Figure 11:
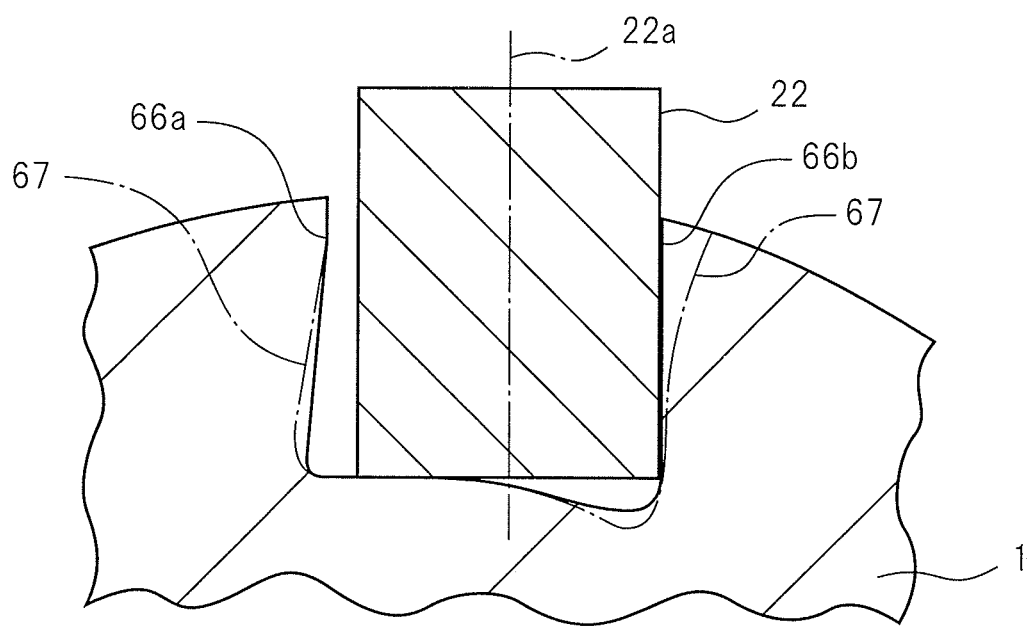
FIG. 11 is a schematic cross-sectional view which explains machining of a first return path in the groove-forming method of an embodiment.

FIG. 10 is a schematic cross-sectional view when machining one side surface 66a in an outbound path in first machining. FIG. 11 is a schematic cross-sectional view when machining the other side surface 66b in a return path in first machining. In these figures, the final machined surface 67 which is finally formed is shown. By performing machining a plurality of times, machining is performed so that the side surfaces 66a, 66b of the groove part 66 match the final machined surface 67.

In the outbound path of the first machining, it is possible to cut the top part of one side surface 66a to become substantially the same as the final machined surface 67. In this regard, at the bottom part of the one side surface 66a, it is not possible to perform the machining to the final machined surface 67 and uncut parts remain. In the return path of the first machining operation, it is possible to cut the bottom part of the other side surface 66b to the final machined surface 67. In this regard, it is not possible to cut the top part of the other side surface 66b to the final machined surface 67 and uncut parts remain.

Figure 12:
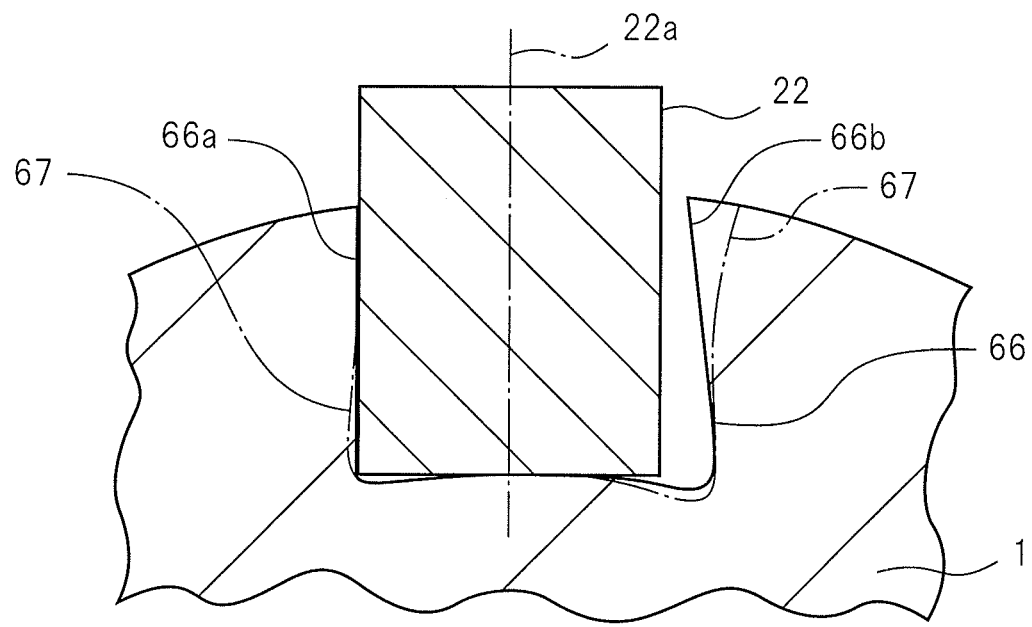
FIG. 12 machining a schematic cross-sectional view which explains machining of a second outbound path in the groove-forming method of an embodiment.
Figure 13:
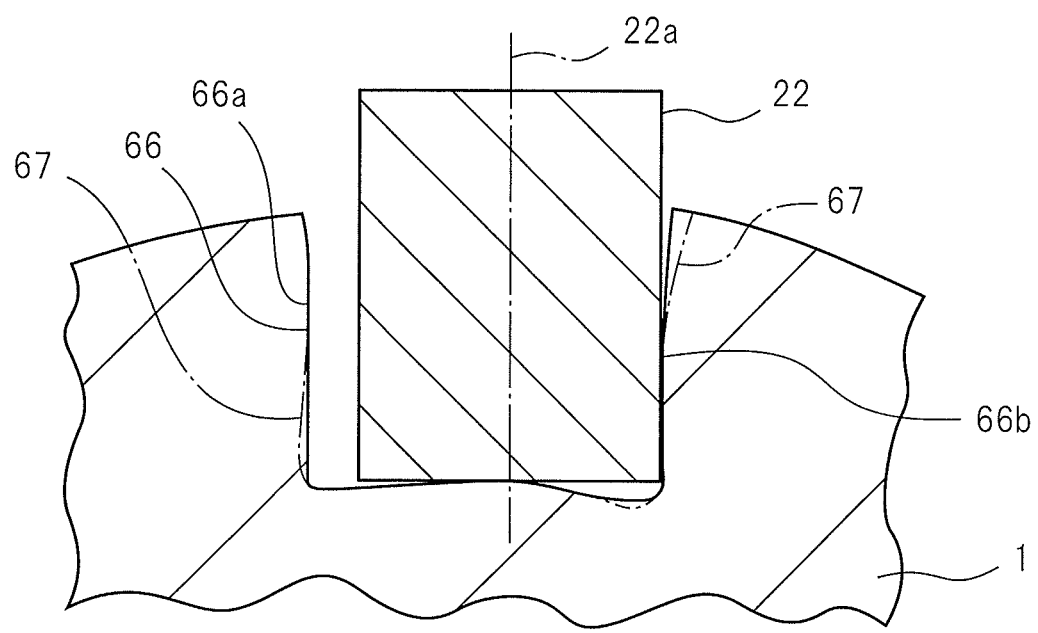
FIG. 13 is a schematic cross-sectional view which explains machining of a second return path in the groove-forming method of an embodiment.

FIG. 12 is a schematic cross-sectional view when machining a second outbound path. FIG. 13 is a schematic cross-sectional view when machining a second return path. In the outbound path of the second machining, it is possible to machine the bottom part of one side surface 66a so as to approach the final machined surface 67. Further, in the second return path, it is possible to machine the top part of the other side surface 66b so as to approach the final machined surface 67.

Figure 14:
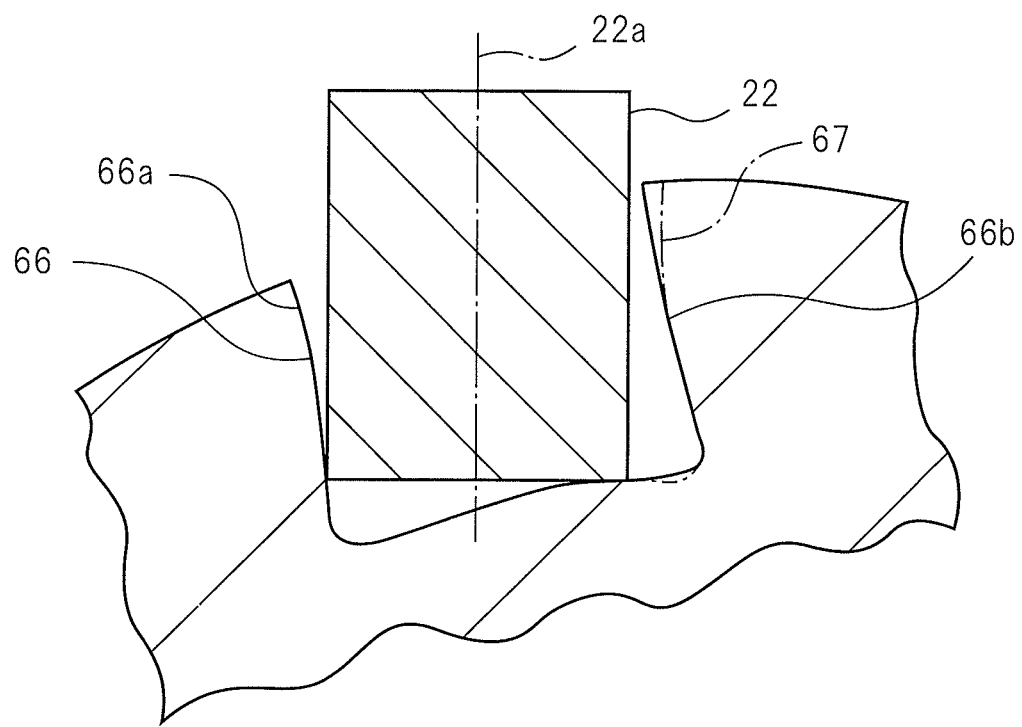
FIG. 14 is a schematic cross-sectional view which explains machining of a third outbound path in the groove-forming method of an embodiment.
Figure 15:
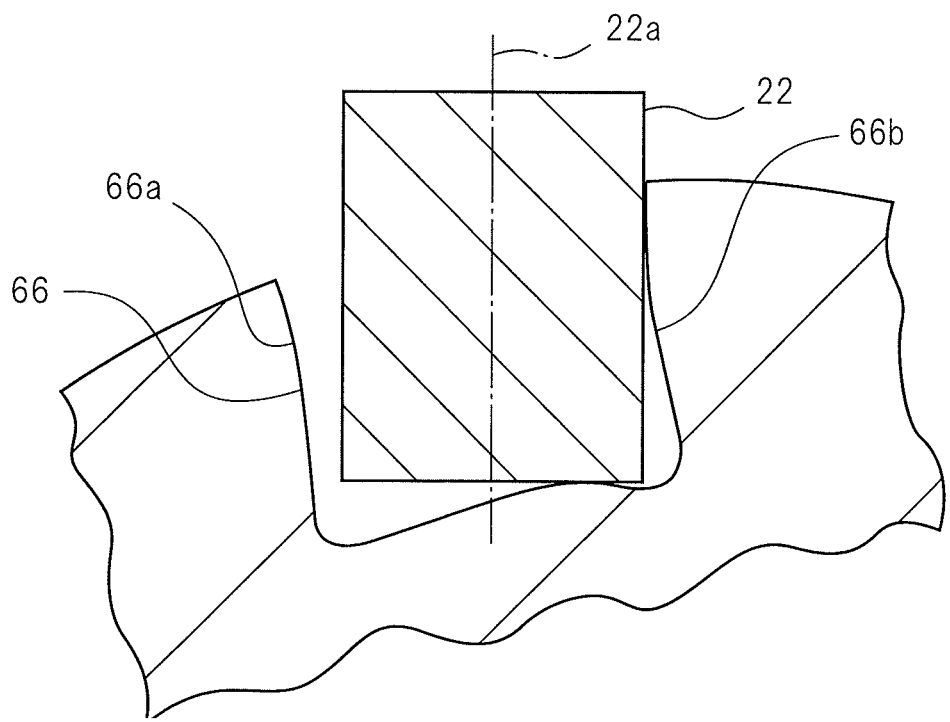
FIG. 15 is a schematic cross-sectional view which explains machining of a third return path in the groove-forming method of an embodiment.

FIG. 14 is a schematic cross-sectional view when machining a third outbound path. FIG. 15 is a schematic cross-sectional view when machining a third return path. In the third outbound path and the return path, it is possible to cut the uncut parts of the one side surface 66a and the other side surface 66b. As a result, the groove part 66 can be made to match the shape of the final machined surface 67.

In this way, the groove-forming method in the present embodiment includes a machining step of machining a workpiece 1 by making a rotary tool 22 move relative to the workpiece 1 by a tool path along a direction of extension of the groove part 66. The machining step arranges the rotary tool 22 so that the rotary tool 22 is inscribed inside the circle 84 which has a diameter the same as the width of the groove part 66 which is formed in the workpiece 1. Further, it performs machining a plurality of times while changing the relative position of the rotary tool 22 with respect to the workpiece 1. By employing this method, it is possible to form a groove part with a width larger than the diameter of the rotary tool in a short time. Further, even without using a rotary tool which has the same diameter as the groove width, it is possible to form a groove part with a high precision. Further, even if the width of the groove part which is formed changes, there is no need to change the tool head etc. It is possible to form a groove part by a rotary tool which has a diameter smaller than the groove width.

For example, it is possible to perform machining in a shorter time than the case of using a dedicated tool head for making a rotary tool engage in planetary rotation motion. Referring to FIG. 6, in the dedicated tool head for making the rotary tool engage in planetary rotation motion, the rotary tool is made to be inscribed inside the circle 84 for orbital motion. In this regard, due to the planetary rotation motion, the tool head cannot be raised in rigidity and the cutting rate ends up being limited small. As opposed to this, in the groove-forming method of the present embodiment, it is possible to increase the cutting rate of the workpiece and form a groove in a short time.

Further, when making the rotary tool engage in planetary rotation motion, there are many regions in which the rotary tool does not contact the workpiece, so time is taken. As opposed to this, in the groove-forming method in the present embodiment, it is possible to set the path of the rotary tool at only the regions which are required for forming the groove part 66 and therefore possible to form the groove in a short time.

For example, as shown in FIG. 6, the range of inscription inside the circle 84 which has the same diameter as the width of the groove part 66 includes the range of machining the side surfaces of the groove part 66 and the range of not machining the side surfaces of the groove part 66. In the range approaching the side surfaces of the groove part, the side surfaces of the groove part 66 are machined, but in the range which is shown by the arrow 105 other than this range, the operation does not contribute to machining of the side surfaces of the groove part 66. For this reason, it is possible to arrange the rotary tool 22 while avoiding the range which is shown by the arrow 105 so as to shorten the machining time. By performing machining a plurality of times inside of the range of machining the side surfaces 66a, 66b of the groove part 66 while changing the relative position of the rotary tool 22, it is possible to shorten the machining time.

In the groove-forming method of the present embodiment, one side surface 66a is machined at the outbound path and the other side surface 66b is machined at the return path. By employing this groove-forming method, it is possible to form the groove part 66 at the outbound path and the return path and possible to form the groove part of the desired shape in a short time. Note that, in the groove-forming operation, it is also possible to machine one side surface consecutively a plurality of times, then machine the other side surface consecutively a plurality of times.

Furthermore, in the present embodiment, while maintaining the rotation direction of rotation of the rotary tool 22, at the outbound path, one side surface 66a of the groove part 66 is machined, while at the return path, the other side surface 66b of the groove part 66 is machined. That is, at the outbound path and the return path, the rotation direction of the rotary tool 22 is maintained the same. By employing this method, it is possible to make the cutting conditions the same at the outbound path and the return path. That is, at the outbound path and the return path, the groove part can be formed by either the machining method of a down cut or an up cut. For this reason, it is possible to make the machining precision of one side surface and the other side surface substantially the same.

Next, the control device of a machine tool and tool path generating device which are used for the groove-forming method of the present embodiment will be explained.

Figure 16:
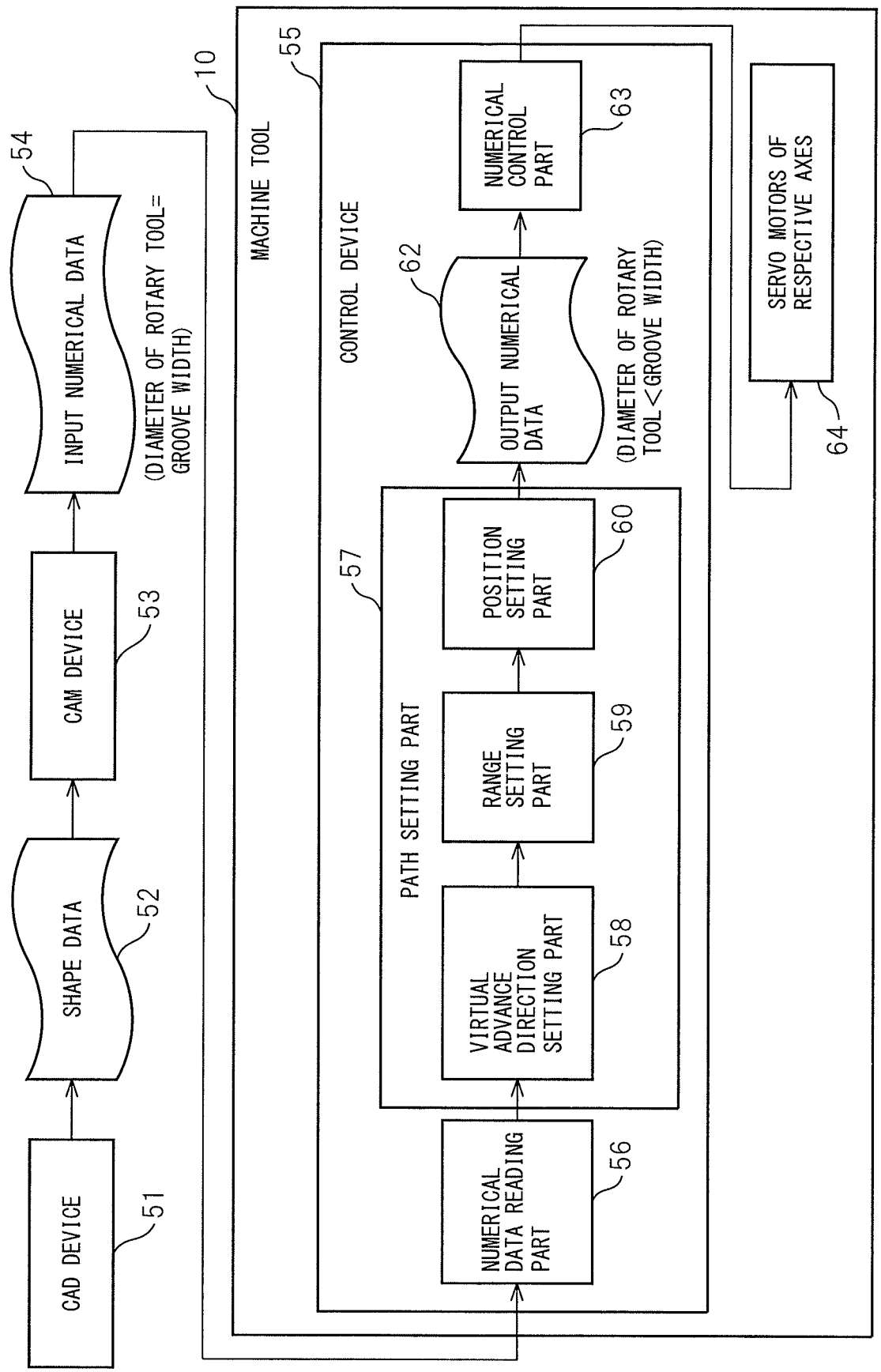
FIG. 16 is a schematic view of a machining system which forms a workpiece in an embodiment.

FIG. 16 is a schematic view of a of a machining system provided with a machine tool 10 and a device which generates input numerical data 54 to be input to the machine tool in the present embodiment. In the present embodiment, a CAD (computer aided design) device 51 is used to design the shape of the workpiece 1. The CAD device 51 supplies shape data 52 of the workpiece 1 to a CAM (computer aided manufacturing) device 53. The shape data 52 includes data on the shape of the groove part 66 which is formed at the workpiece 1.

In the CAM device 53, the shape data 52 is used as the basis to generate input numerical data 54 as input information for input to the control device 55 of the machine tool 10. The input numerical data 54 in the present embodiment is numerical data when using a rotary tool 81 of the comparative example which has a diameter the same as the width of the groove part 66 so as to form the groove part.

The numerical control type of machine tool 10 in the present embodiment is provided with a control device 55. The control device 55 in the present embodiment includes an arithmetic processing device. The arithmetic processing device has a microprocessor (CPU) for performing arithmetic processing etc., a ROM (read only memory) and a RAM (random access memory) served as storage devices, and other peripheral circuits.

The control device 55 uses the input numerical data 54 to generate the output numerical data 62. The output numerical data 62 includes instructions for the machine when using a rotary tool 22 which has a diameter smaller than the width of the groove part 66. The output numerical data 62 includes information of the tool path for performing machining a plurality of times for forming the groove part 66. In the present embodiment, the output numerical data 62 includes numerical data which makes the rotary tool 22 move relative to the workpiece 1.

The control device 55 in the present embodiment includes a numerical data reading part 56 which functions as an input information reading part and a path setting part 57. The numerical data reading part 56 has the function of reading the input numerical data 54. The path setting part 57 uses the read input numerical data 54 as the basis to generate the output numerical data 62. The path setting part 57 in the present embodiment includes a virtual advance direction setting part 58, a range setting part 59, and a position setting part 60. The output numerical data 62 is input to the numerical control unit 63. The numerical control unit 63 uses the output numerical data 62 as the basis to drive the servo motors 64 of respective axes. The servo motors 64 of respective axes include the X-axis servo motor 38, Y-axis servo motor 31, Z-axis servo motor 25, and B-axis servo motor 43.

Figure 17:
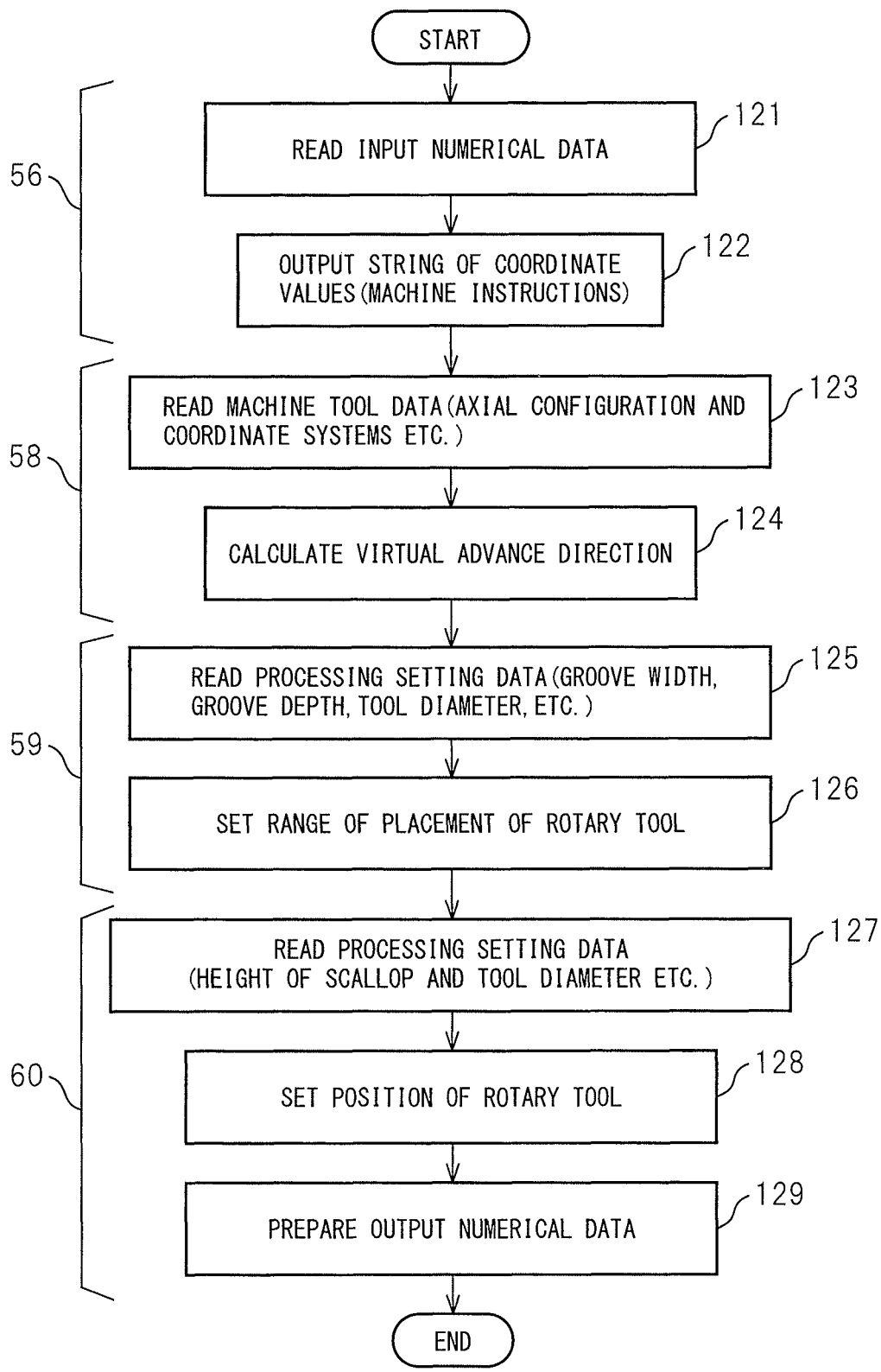
FIG. 17 is a flow chart which explains control by a control device of a machine tool in an embodiment.

FIG. 17 is a flow chart of the control in a control device of a machine tool of the present embodiment. Referring to FIG. 16 and FIG. 17, the numerical data reading part 56 of the control device 55 receives as input the input numerical data 54 which was generated by the CAM device 53. The input numerical data 54 in the present embodiment includes data which shows the path of the tool front end point when using a rotary tool 81 which has a diameter the same as the width of the groove part 66. The input numerical data 54, for example, is configured by the coordinate values of the XYZ axes and the rotational angle of the ABC axes. The input information which is input to the control device 55 is not limited to the above numerical data. It is possible to employ input information which shows the path of any part of the rotary tool when the diameter of the rotary tool is the same as the width of the groove part 66. For example, the input information may also be prepared by macro codes.

In the control device 55, first, at step 121, the numerical data reading part 56 reads the input numerical data 54. At step 122, it outputs a string of coordinate values. The "string of coordinate values" here is configured by the coordinate values of the XYZ axes and the rotational angles of the ABC axes.

Next, the path setting part 57 sets a tool path for performing machining using a rotary tool 22 which has a diameter smaller than the width of the groove part 66. At step 123, the virtual advance direction setting part 58 of the path setting part 57 reads the data of the machine tool 10. The data of the machine tool 10 includes the axial configuration and coordinate systems etc. of the machine tool 10. Next, at step 124, the virtual advance direction setting part 58 calculates the virtual direction of advance.

Figure 18:
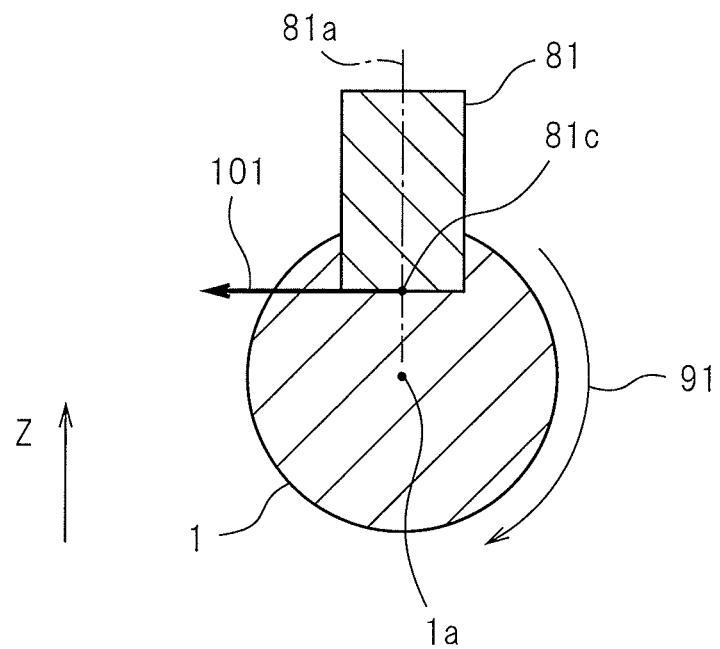
FIG. 18 is a schematic cross-sectional view which explains a virtual direction of advance of a rotary tool of a comparative example.

FIG. 18 is a schematic cross-sectional view which explains the virtual direction of advance. The virtual direction of advance is the direction of advance of the rotary tool 81 with respect to the workpiece 1 when assuming that the workpiece 1 has stopped. As the virtual direction of advance, for example, it is possible to employ the direction in which the tool front end point 81*c* of the rotary tool 81 proceeds. In the example which is shown in FIG. 18, the position of the rotary tool 81 is not changed and the workpiece 1 is made to rotate in the direction which is shown by the arrow 91. That is, the center axis 81*a* of the rotary tool 81 is in a stopped state while the workpiece 1 is made to rotate. At this time, the virtual direction of advance of the rotary tool 81 assuming the workpiece 1 has stopped becomes the direction which is shown by the arrow 101. The virtual direction of advance can, for example, be set by a vector of a unit length in the XYZ axes.

Figure 19:
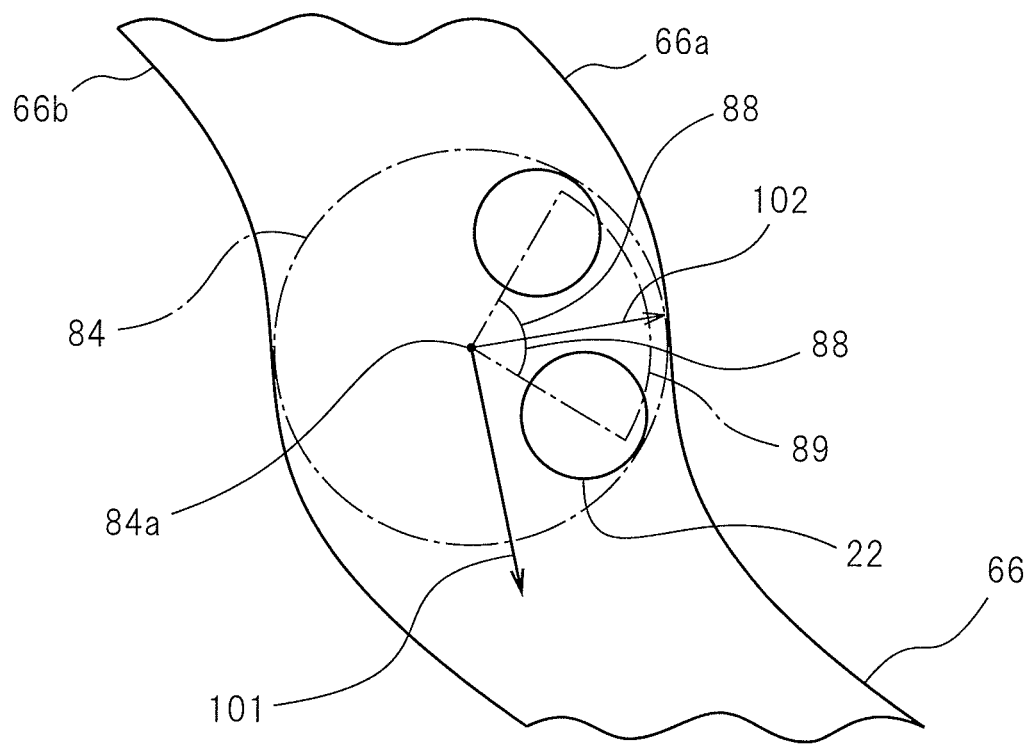
FIG. 19 is a schematic view which explains a virtual direction of advance of a rotary tool and a range of placement of a rotary tool in control by a control device of a machine tool of an embodiment.

FIG. 19 is a schematic plan view of a rotary tool and a groove part when forming a groove in the present embodiment. FIG. 19 shows an example of use of a rotary tool 22 with a small diameter. The virtual direction of advance is the direction which is shown by the arrow 101. That is, the virtual direction of advance shows the direction at the time when the virtual rotary tool 81 which has the same diameter as the circle 84 advances along the direction of extension of the groove part 66.

Referring to FIG. 16 and FIG. 17, the case of using a rotary tool 81 of the comparative example having a diameter the same as the groove width is assumed up to step 124. Next, the virtual direction of advance of the rotary tool 81 is used as the basis to set the tool path of a rotary tool 22 which has a diameter smaller than the groove width. The range setting part 59 of the control device 55 sets the range of placement of the rotary tool 22.

The range setting part 59 reads the processing setting data at step 125. The processing setting data includes the width of the groove part 66, the depth of the groove part 66, the diameter of the rotary tool 22, etc. At step 126, the processing setting data and the virtual direction of advance are used to set a range of placement of the rotary tool 22.

FIG. 19 shows a range 89 for placement of the rotary tool 22. The rotary tool 22 is arranged in the range 89 so as to be inscribed inside the circle 84 which has a diameter the same as the groove width. In the present embodiment, a reference direction vertical to the virtual direction of advance which is shown in the arrow 101 is set. The direction which is shown by the arrow 102 is the reference direction. The range of the predetermined angle 88 with respect to the reference direction is set as the range 89 of placement of the rotary tool 22. Note that, as the predetermined angle 88, it is preferable to set a range where the rotary tool 22 does not turn idly so as to obtain a position where the rotary tool 22 machines the side surfaces of the groove part 66. That is, the range of the predetermined angle 88 is preferably set to a range where there is no tool path for only an air cut where the workpiece is not machined.

Referring to FIG. 16 and FIG. 17, next, the position setting part 60 sets the position of placement of the rotary tool 22. The position setting part 60 reads the machining setting data at step 127. As the machining setting data, the scallop height and tool diameter etc. are included.

Figure 20:
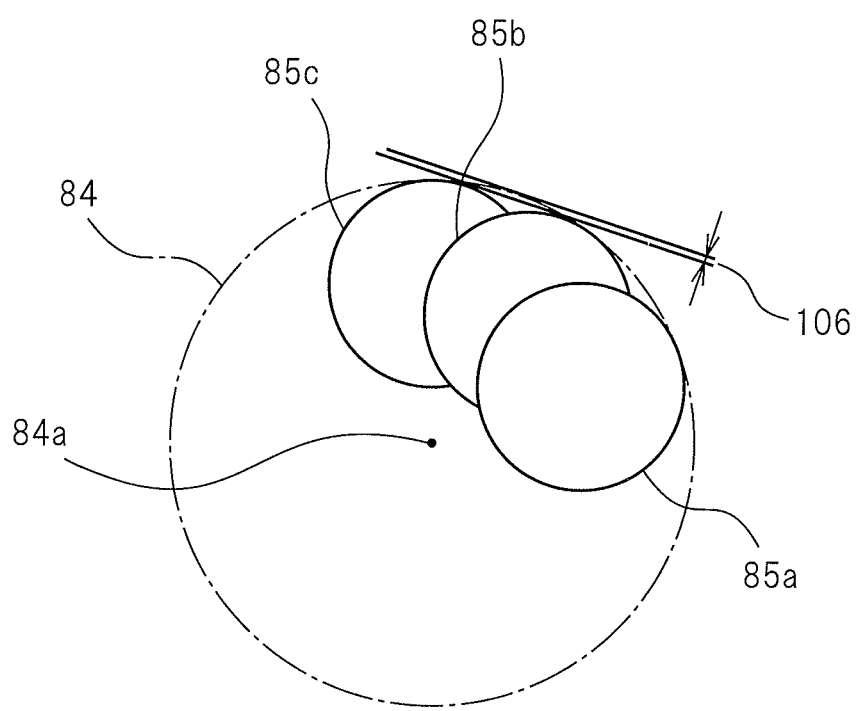
FIG. 20 is a schematic view which explains a scallop height.

FIG. 20 is a schematic view which explains a scallop height. In the present embodiment, positions 85*a*, 85*b*, and 85*c* of the rotary tool 22 are set so as to be inscribed inside the circle 84. For this reason, the scallop height which is shown by the arrow 106 is determined in accordance with the position of the rotary tool 22. Further, the scallop height also depends on the diameter of the rotary tool 22. For example, at the inside of the range 89 of placement of the rotary tool 22, the number of positions of placement of the rotary tool 22 is increased. Further, by making the interval between positions of placement of the rotary tool 22 smaller, it is possible to reduce the scallop height. That is, it is possible to increase the number of times of machining the side surfaces of the groove part so as to reduce the scallop height.

Referring to FIG. 16 and FIG. 17, at step 128, the machining setting data can be used as the basis to set the position of the rotary tool 22. That is, a plurality of positions of the rotary tool 22 are set inside of the range of placement of the rotary tool 22. The positions of the rotary tool 22 can, for example, be expressed by the coordinate values of the XYZ axes. Alternatively, for example, it is possible to output a difference from the string of coordinate values which are output at step 122.

Next, the position setting part 60 outputs the output numerical data 62 at step 129. The output numerical data 62, for example, can be set by the coordinates of the XYZ axes and the relative angles between the rotary tool 22 and workpiece 1 at the ABC axes.

In this way, the control device 55 in the present embodiment generates output numerical data 62. The numerical control unit 63 uses the output numerical data 62 as the basis to drive the servo motors 64 of respective axes. Due to this, it is possible to adjust the relative positions of the workpiece 1 and the rotary tool 22.

The path setting part 57 in the present embodiment sets a plurality of tool paths while changing the relative position of the rotary tool 22 with respect to the workpiece 1 so that the rotary tool 22 is inscribed inside the circle 84 which has the same diameter as the width of a groove part 66 which is formed in the workpiece 1. Further, the set tool paths are used for performing the machining. Due to this constitution, in the same way as the groove-forming method in the present embodiment, it is possible to form a groove part precisely in a short time.

Further, the path setting part 57 in the present embodiment includes a virtual advance direction setting part 58 which uses the input numerical data 54 as the basis to set a virtual direction of advance when using the rotary tool 81 of the comparative example to form the groove part 66, a range setting part 59 which uses the virtual direction of advance to set a range of placement of the rotary tool 22, and a position setting part 60 which sets a plurality of positions of the rotary tool 22 for the range of placement of the rotary tool 22. By employing this constitution, it is possible to use a simple constitution to set a plurality of tool paths of the rotary tool 22.

Further, the range setting part 59 in the present embodiment sets the direction vertical to the virtual direction of advance as the reference direction and sets a range of a predetermined angle with respect to the reference direction so as to set the range of placement of the rotary tool 22. Due to this constitution, it is possible to easily set the range of placement of the rotary tool 22 so as to follow the direction of extension of the groove part 66.

In setting the range of placement of the rotary tool 22 in the present embodiment, a single predetermined angle with respect to the reference direction is used for the entire groove part 66. In setting the range of placement of the rotary tool 22, the invention is not limited to this. It is also possible to change the angle with respect to the reference direction depending on the location in the groove part. For example, when viewing the groove part by a plan view, it is also possible to change the range of placement of the rotary tool by the curved shaped part and the straight shaped part.

Further, the range of inscription inside the circle 84 which has the same diameter as the width of the groove part includes a range of machining the side surfaces 66a, 66b of the groove part 66 and a range of not machining the side surfaces of the groove part 66. The position setting part 60 preferably sets the relative position of the rotary tool 22 with respect to the workpiece 1 at the inside of the range of machining of the side surfaces 66a, 66b of the groove part 66. Due to this constitution, it is possible to shorten the machining time in a groove-forming operation.

In the above explanation of the present embodiment, the shape data which the CAD device outputs is used as the basis to generate the input numerical data in the CAM device. This input numerical data is used in the control device of the machine tool to prepare output numerical data which forms the path of the rotary tool, but the invention is not limited to this. Shape data which is output from the CAD device may also be used inside of the CAM device to prepare output numerical data.

Figure 21:
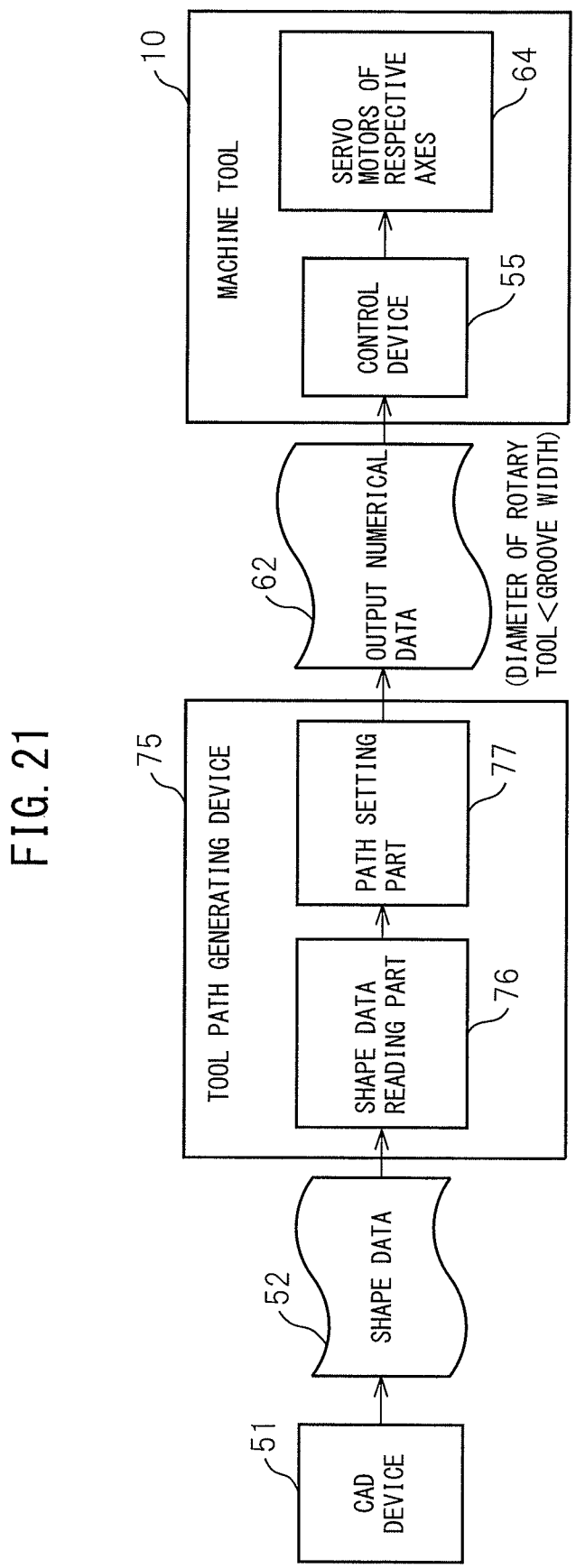
FIG. 21 is a schematic view of another machining system in an embodiment.

FIG. 21 is a schematic view of a machining system provided with a CAD device and a tool path generating device in the present embodiment. The generation of shape data 52 by the CAD device 51 is similar to that in the machining system which is shown in FIG. 16. The tool path generating device 75 in the present embodiment has the function of a CAM device. Further, the tool path generating device 75 has the function of using shape data 52 as the basis to generate output numerical data 62 of a tool path for machining a plurality of times.

The tool path generating device 75 in the present embodiment is provided with a shape data reading part 76 and a path setting part 77. The shape data reading part 76 in the present embodiment reads the shape data 52 after machining of the workpiece 1. The path setting part 77 uses the shape data 52 of the workpiece 1 as the basis to set a tool path for making a rotary tool 22 with a diameter smaller than the width of the groove part 66 move relatively in the direction of extension of the groove part 66.

The path setting part 77, for example, has the functions of the CAM device 53, numerical data reading part 56, and path setting part 57 of the machining system according to FIG. 16. The path setting part 77, for example, uses the shape data 52 as the basis to generate the input numerical data 54 which shows the path of the rotary tool 81 of a comparative example. The input numerical data 54 is used to generate output numerical data 62 which shows the path of the rotary tool 22. At this time, it is also possible set a plurality of tool paths which is changed in relative position of the rotary tool 22 to the workpiece 1 so as to be inscribed inside the circle 84 having the same diameter as the width of the groove part 66 which forms the workpiece 1. The path setting part is not limited to this. It is also possible to not generate the input numerical data. That is, the path setting part may also use the shape data to calculate the virtual direction of advance, the range of placement and the position of placement of the rotary tool, etc. and generate output numerical data.

The output numerical data 62 is input to the machine tool 10. The control device 55 of the machine tool 10 uses the output numerical data 62 to drive the servo motors 64 of respective axes. It is therefore possible to make the rotary tool 22 move relative to the workpiece 1.

In the tool path generating device in the present embodiment as well, it is possible to generate a tool path which can form a groove part precisely in a short time.

The movement device for making the rotary tool 22 and the workpiece 1 relatively move in the present embodiment is formed to make the rotary tool 22 move with respect to the workpiece 1 in the X-axis and Y-axis and to move the workpiece 1 with respect to the rotary tool 22 in the Z-axis and B-axis, but the invention is not limited to this. The movement device may also be formed so that at least one of the workpiece and rotary tool can move relative to these axes.

In the present embodiment, the virtual direction of advance was calculated and the virtual direction of advance was used as the basis to set the range of placement of the rotary tool and the position of the rotary tool, but the invention is not limited to this. The position of the rotary tool may also be set without using the virtual direction of advance. For example, the position of the rotary tool may also be set based on the direction of extension of the groove part.

The numerical control type of machine tool in the present embodiment has a single rotational feed axis and a plurality of linear feed axes, but the invention is not limited to this. The present invention can be applied to a numerical control type of machine tool which has a rotational feed axis and other feed axes. For example, the present invention can also be applied to a numerical control type of machine tool which has a rotational feed axis and a single linear feed axis and a numerical control type of machine tool which has two or more rotational feed axes etc.

In the present embodiment, the explanation was given with reference to the example where the depth of the groove part and the width of the groove part became constant, but the invention is not limited to this. The present invention can also be applied to machining where the depth of the groove part is changed and machining where the width of the groove part is changed.

The above embodiments can be suitably combined. In the above figures, the same or equivalent parts are assigned the same reference signs. Note that, the above embodiments are illustrative and do not limit the invention. Further, in the embodiments, the changes shown in the claims are included.

REFERENCE SIGNS LIST 1 workpiece
1a center axis
10 machine tool 20 spindle
22 rotary tool
22a center axis
25 Z-axis servo motor
31 Y-axis servo motor
38 X-axis servo motor
42 rotary table
43 B-axis servo motor
51 CAD device
52 shape data
53 CAM device
54 input numerical data
55 control device
56 numerical data reading part
57 path setting part
58 virtual advance direction setting part
59 range setting part
60 position setting part
62 output numerical data
66 groove part
66a, 66b side surfaces
75 tool path generating device
76 shape data reading part
77 path setting part
81 rotary tool
84 circle
85a, 85b, 85c positions
86a, 86b, 86c positions
88 angle
89 range

The invention claimed is:

1. A groove-forming method using a machine tool comprising a rotational feed axis and another feed axis to make a rotary tool and a workpiece relatively move to each other while forming a groove part in said workpiece, the rotary tool having a diameter smaller than a width of the groove part, said groove-forming method comprising:
   a machining step of making said rotary tool move relative to the workpiece along a tool path in a direction of extension of said groove part by the another feed axis while the workpiece is rotated relative to the rotary tool by the rotational feed axis, so as to machine said workpiece;
   determining a virtual rotary tool that has the same diameter as the width of the groove part; and
   repeating said machining step a plurality of times to form the groove part while changing a relative position of said rotary tool with respect to said workpiece so that a surface of said rotary tool contacts a surface of the virtual rotary tool when the virtual rotary tool is projected in the groove part to be formed and so that a center axis of the rotary tool is parallel with a center axis of the virtual rotary tool,
   wherein in each of the repeated machining steps, said rotary tool is moved to follow the tool path extending in the direction of extension of said groove part in a state in which the relative position of the rotary tool with respect to the virtual rotary tool is maintained as a position specific for the each of the repeated machining steps so that the surface of the rotary tool contacts the surface of the virtual rotary tool at a same point, while the relative position of the rotary tool with respect to the virtual rotary tool is changed from one machining step to another machining step,
   wherein the repeating of the machining step a plurality of times forms the groove part on a portion of the workpiece in which no material has been removed such that the repeated machining steps successively remove uncut portions of side surfaces of the groove part.

2. The groove-forming method according to claim 1, wherein said machining step includes an outbound and return movement step which makes said rotary tool move reciprocating along a direction of extension of said groove part,
   one of side surfaces of said groove part is machined at an outbound path of said outbound and return movement step, and the other side surface of said groove part is machined while maintaining a rotation direction of rotation of said rotary tool the same as said rotation direction of said outbound path at a return path of said outbound and return movement step.

3. The groove-forming method according to claim 1, wherein a range the contact with the surface of the virtual rotary tool which has the same diameter as said width of said groove part has a range of machining a side surface of said groove part and a range of not machining said side surface of said groove part, and
   said machining step is repeated a plurality of times while changing said relative position of said rotary tool in said range of machining said side surface of said groove part.

4. The groove-forming method according to claim 1, which, when making a direction vertical to said direction of extension of said groove part a reference direction, performs machining a plurality of times while changing said relative position of said rotary tool with respect to said workpiece at the inside of a range of a predetermined angle with respect to said reference direction.

* * * * *